US005640643A

United States Patent [19]

Hoitz et al.

[11] Patent Number: 5,640,643

[45] Date of Patent: Jun. 17, 1997

[54] APPARATUS FOR EMPTYING AND RINSING OUT PHOTOGRAPHIC CHEMICAL CONTAINERS INTO A MIXING TANK

[75] Inventors: Gerd Hoitz, Bad Ditzenbach; Ulrich Kowatsch, Leonberg, both of Germany

[73] Assignee: Eastman Kodak Company, Rochester, N.Y.

[21] Appl. No.: 562,770

[22] Filed: Nov. 27, 1995

[30] Foreign Application Priority Data

Dec. 17, 1994 [DE] Germany .......................... 44 45 152.0

[51] Int. Cl.[6] .............................. G03B 13/10; B08B 3/02

[52] U.S. Cl. .................... 396/661; 134/104.2; 134/166 R

[58] Field of Search .................................... 354/324, 325, 354/354; 366/349; 137/240; 134/62, 104.2, 166 R, 167 R, 168 R; 222/64

[56] References Cited

U.S. PATENT DOCUMENTS

| | | | |
|---|---|---|---|
| 3,727,889 | 4/1973 | Nagel | 366/349 |
| 4,186,759 | 2/1980 | Stevenson et al. | 137/240 |
| 4,406,298 | 9/1983 | Martin | 134/167 R |
| 4,653,518 | 3/1987 | Adachi | 134/62 |
| 4,687,121 | 8/1987 | Copeland | 222/64 |

FOREIGN PATENT DOCUMENTS

| | | | |
|---|---|---|---|
| 0319376 | 6/1989 | European Pat. Off. | |
| 8909792 | 11/1989 | Germany | G03D 3/06 |
| 9102722 | 7/1991 | Germany | G03D 3/06 |
| 9408190 | 8/1994 | Germany | |

*Primary Examiner*—D. Rutledge
*Attorney, Agent, or Firm*—Susan L. Parulski

[57] ABSTRACT

The invention comprises an apparatus for emptying and rinsing out photographic chemical containers into a mixing tank and provides a means of completely removing all chemical residues from the containers in a manner which is safe for the operator. The apparatus has an emptying trough for emptying the chemicals into the mixing tank, the emptying trough having a base and a locating plate opposite the base. In the base there are outlets each of which corresponds to a locating hole in the locating plate for the purpose of emptying the chemical containers through their open necks. In each outlet of the apparatus according to the invention is a nozzle incorporating a valve mechanism which can be operated by placing the neck of a chemical container over the nozzle or removing same.

7 Claims, 5 Drawing Sheets

APPARATUS FOR EMPTYING AND RINSING OUT PHOTOGRAPHIC CHEMICAL CONTAINERS INTO A MIXING TANK

FIELD OF THE INVENTION

The invention comprises an apparatus for emptying and rinsing out photographic chemical containers into a mixing tank, the apparatus having an emptying trough for emptying the chemicals into the mixing tank, the emptying trough having a base and opposite the base a locating plate, and the base having outlets for emptying the contents of the chemical containers, each of those outlets corresponding to a locating hole for a chemical container in the locating plate.

BACKGROUND OF THE INVENTION

The process of developing large quantifies of photographic materials involves the mixing of chemical substances supplied in the form of concentrates to produce a usable processing fluid. The concentrates used may be supplied in solid or liquid form. A known apparatus for emptying such chemical concentrates from their containers or bottles into a mixing tank is described by DE-GM 89 09 792, for example. The necks of the containers are inserted in holders so that the concentrate runs out of the container by the force of gravity into a collecting trough and from there into a measured-delivery tank.

In order that critical concentrations are not created as the concentrates are being mixed, the order in which the various constituents are added should be carefully considered or strictly controlled. DE-GM 91 02 722 describes an emptying/holding apparatus for this purpose by means of which a locking mechanism only allows the chemical containers to be inserted in the holders in the desired specified sequence, the emptying of the chemical containers, however, being once again effected by the force of gravity.

Such methods/apparatuses do not ensure that all chemical residues are removed from the containers. Particularly in the case of liquid concentrates, residues remain behind in the containers despite employment of suitably long dwell times for the liquid to empty out of the containers, with the result that they can not be disposed of without first passing through an additional rinsing process. The separate rinsing stage firstly requires additional work and equipment while secondly, the solution obtained from the rinsing process can not be fed back into the processing cycle without further treatment due to its generally indeterminate concentration.

SUMMARY

The purpose of the present invention is therefore to construct an apparatus for emptying and rinsing out photographic chemical containers which completely removes all chemical residues from the containers and is safe for the operator and which allows the rinsing solution to be fed directly into the processing cycle and used without additional treatment or intermediate storage.

The apparatus, consisting of a nozzle with integral valve mechanism, provides an effective means of rinsing out the chemical containers whereby the resulting solution is fed directly into the mixing tank. A separate collecting and treatment tank is therefore not required. In addition to a reduction in the amount of water used, the environmental impact is further reduced by the fact that only clean containers are recycled for re-use. The valve mechanism ensures that the containers are only rinsed out when the necks of the containers are placed over the nozzle.

The nozzles take the form of a cylindrical tube at one end of which is a side inlet and the other end of which tapers conically to a central outlet through which the rinsing fluid flows. The tube has at least three centering fins arranged radially at evenly spaced intervals around its outer circumference, one of those centering fins performing the function of a valve mechanism. This apparatus firstly provides an effective means of centering and holding the chemical containers during the emptying and rinsing process, and secondly ensures that if the containers are removed before the rinsing process is complete, the valve opens so that the rinsing fluid flows out through a side valve outlet in the tube. Due to the arrangement of the valve outlet and its relation to the rinsing fluid inlet, the rinsing fluid flows into the mixing tank without the operator being exposed to the risk of injury as a result of contact with the chemical residue.

In order to increase the rinsing efficiency, the cone with its central rinsing fluid outlet can be provided with a number of additional outlets around the tip so that a wider spray of rinsing fluid is obtained and thus a greater cleaning effect.

BRIEF DESCRIPTION OF THE DRAWINGS

Additional details and features of the invention are given in the sub claims together with the description of a practical example illustrated in detail by the diagrams as follows:

DETAILED DESCRIPTION

Figure 1:
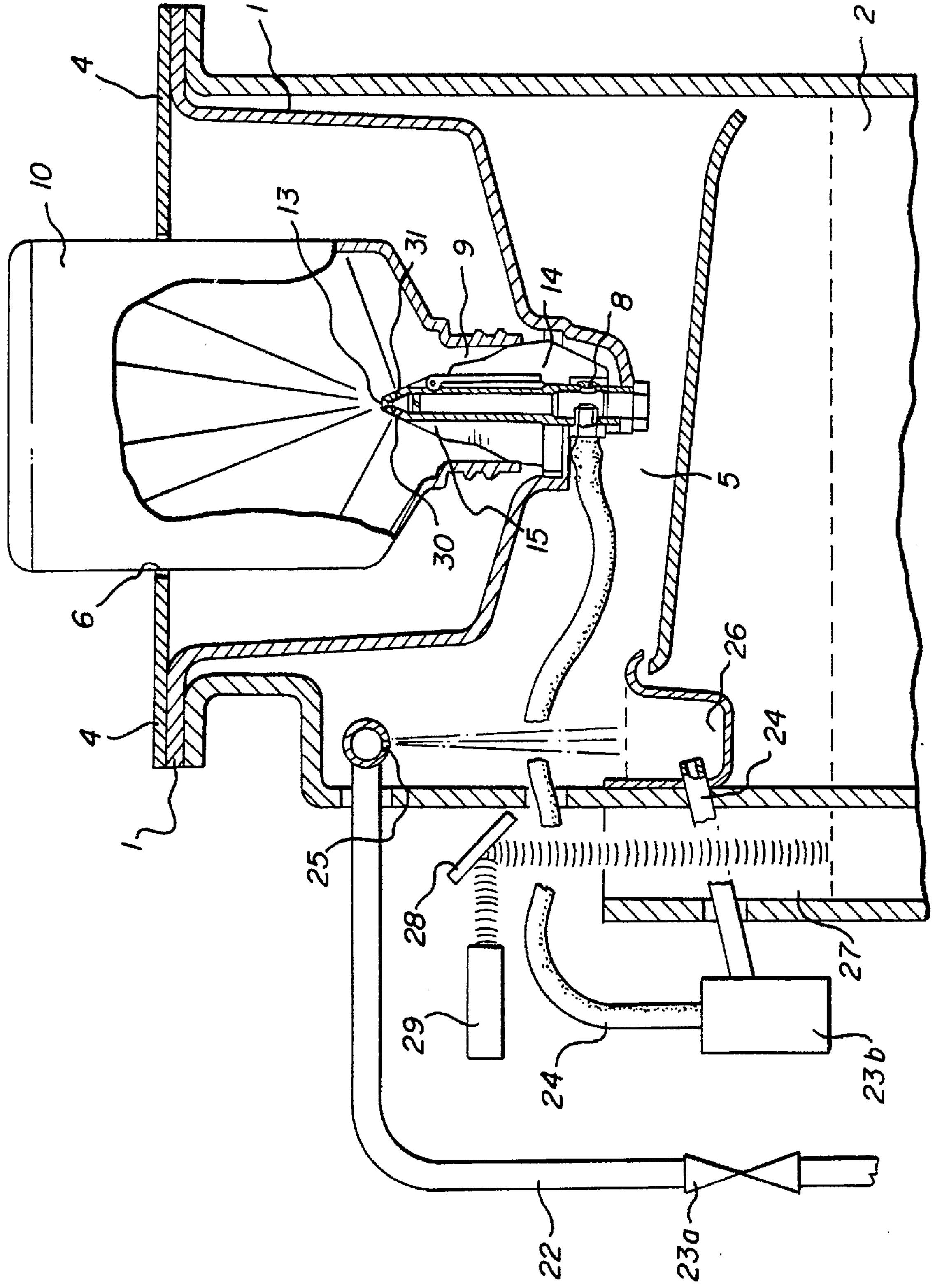
FIG. 1 a schematic diagram of a known mixing unit for photographic processing fluids incorporating the apparatus according to the invention, FIG. 2*a* the side-view cross-section of an emptying trough incorporating the nozzle and valve mechanism, FIG. 2*b* the top view of an emptying trough incorporating the nozzle and valve mechanism, FIG. 3*a* a cross-sectional view of a nozzle with the valve in the closed position, FIG. 3*b* a cross-sectional view of a nozzle with the valve in the open position, FIG. 3*c* the top view of a nozzle.

The apparatus according to the invention as shown in FIG. 1 has an emptying trough 1 covered by a locating plate 4 in which there are locating holes 6. The size and shape of the locating holes 6 are such as to match the chemical containers 10 used which might, for example, contain a defined quantity of developing fluid/fixing solution so as to produce a specific mixture concentration in the mixing tank 2 which is subsequently diluted with an appropriate amount of water to obtain the desired final concentration for the photographic processing fluid. The base 3 of the emptying trough 1 has at least three outlets 5 for emptying the chemical containers 10, each corresponding to a locating hole 6 in the locating plate 4. In each of the outlets 5 there is a nozzle 7 incorporating a valve mechanism 8, the nozzle being such that when the neck 9 of the chemical container 10 is fitted over it, a sealing membrane (not illustrated) across the neck 9 of the container 10 is punctured.

Figure 2A:
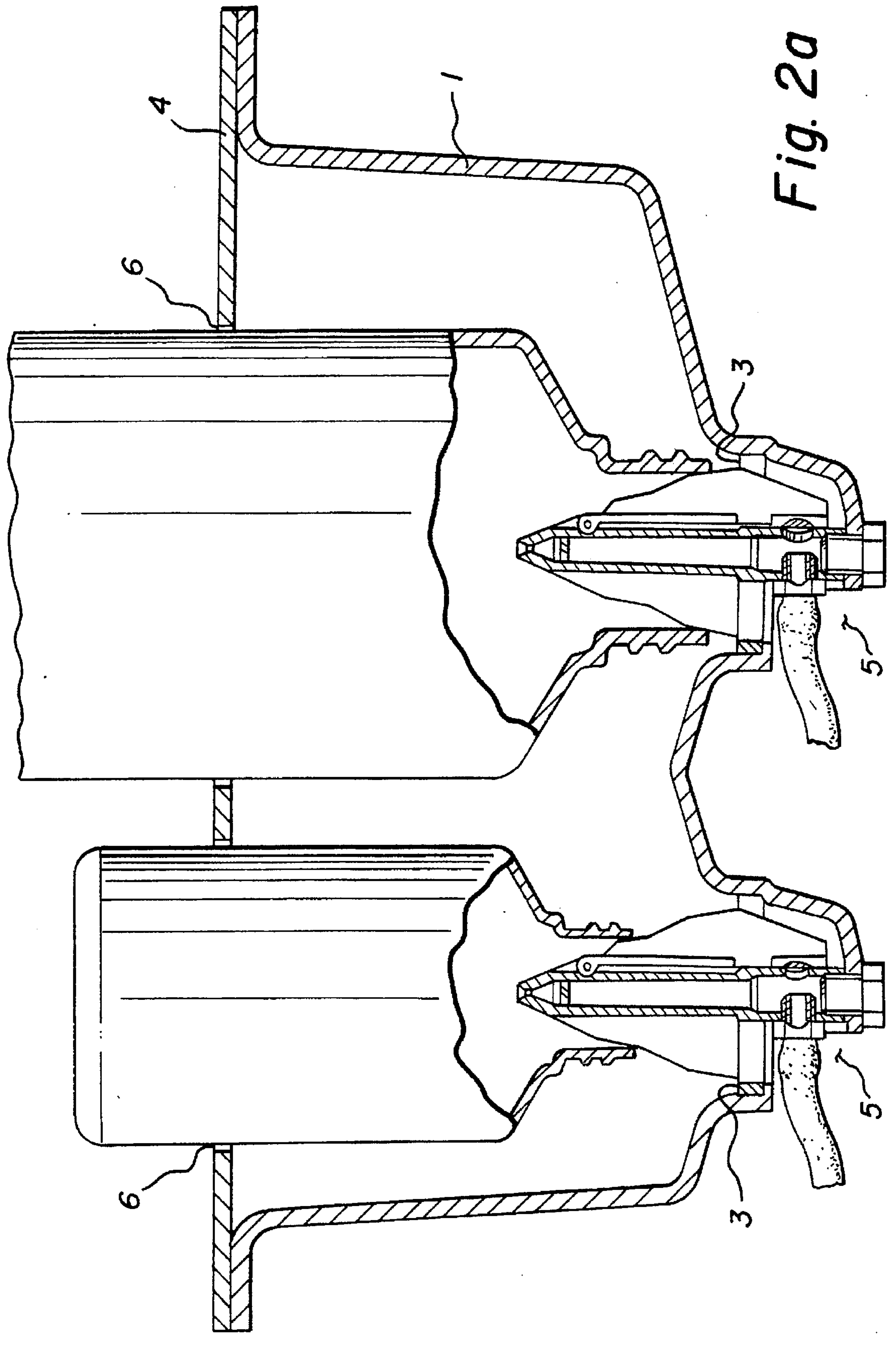
Figure 2B:
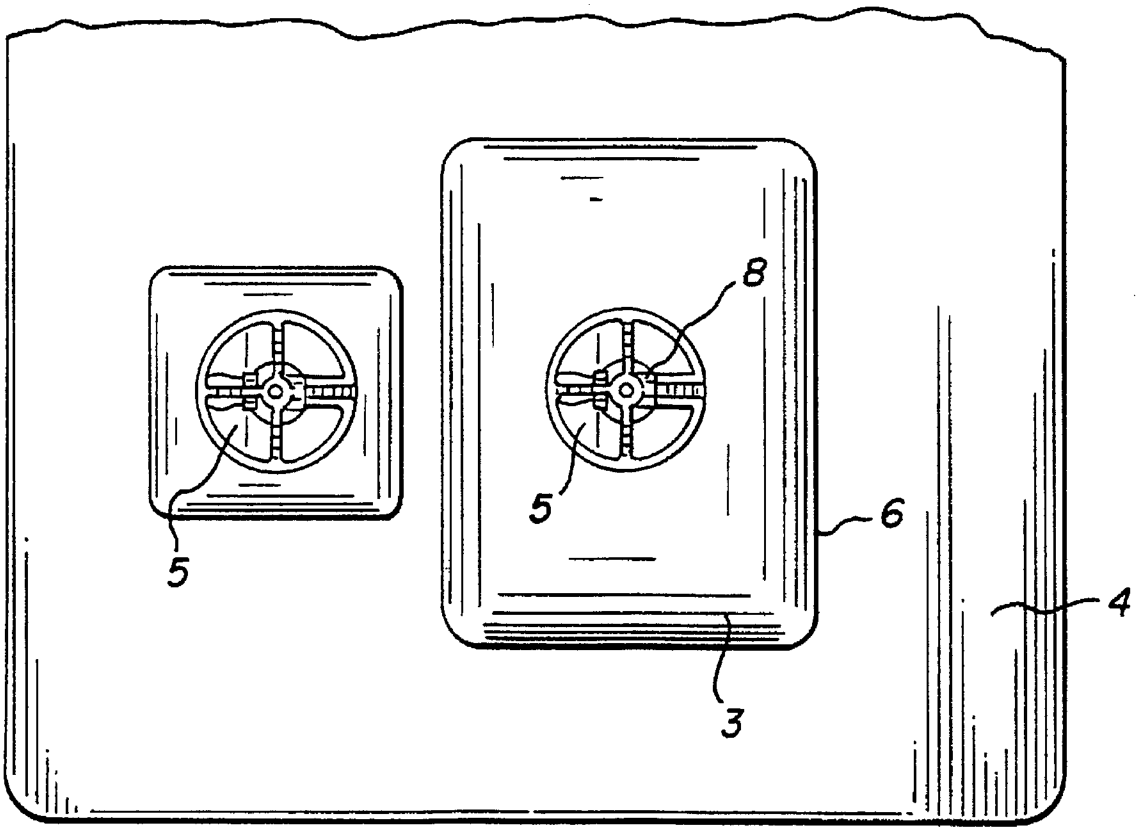
Figure 3A:
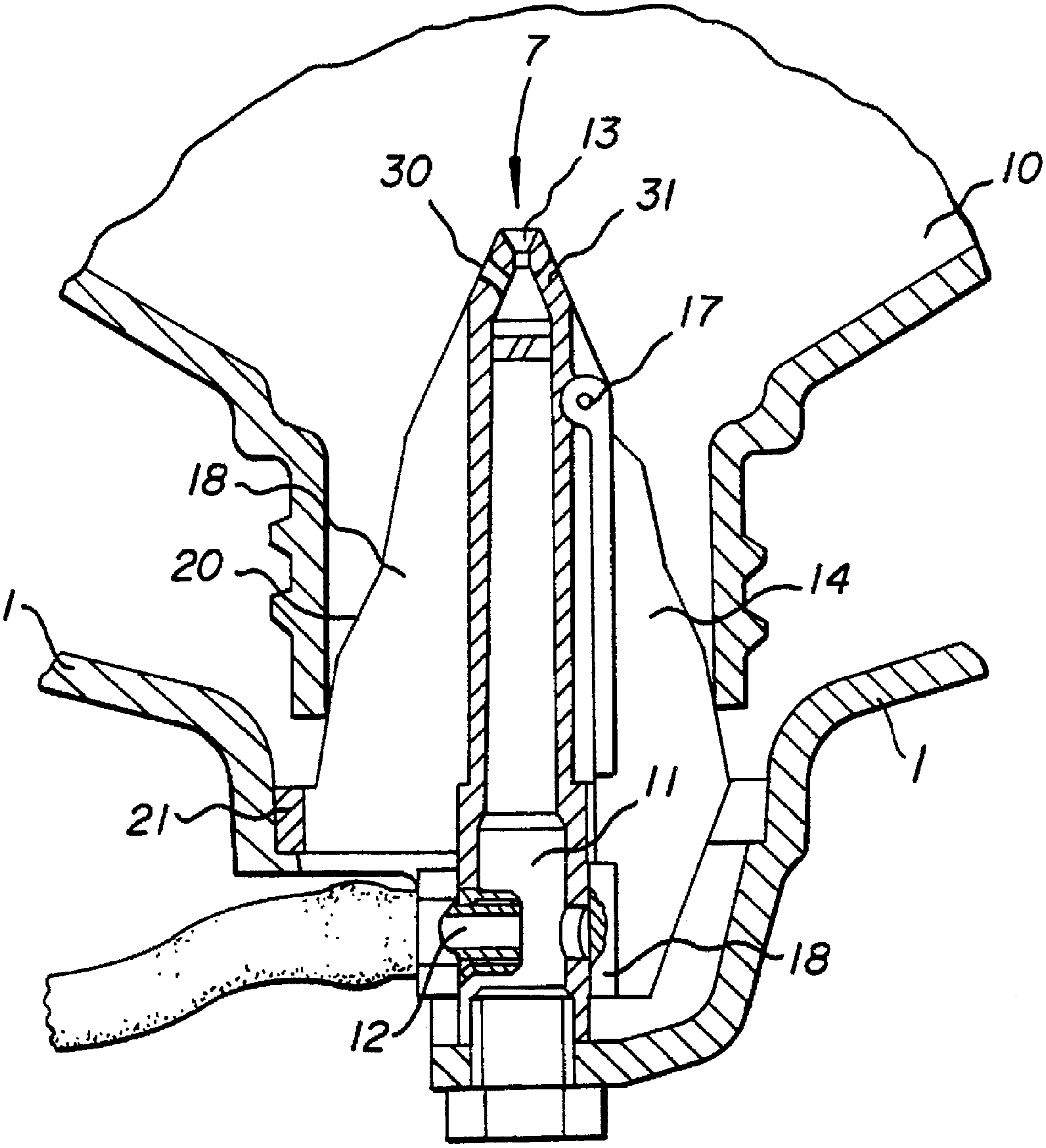
Figure 3B:
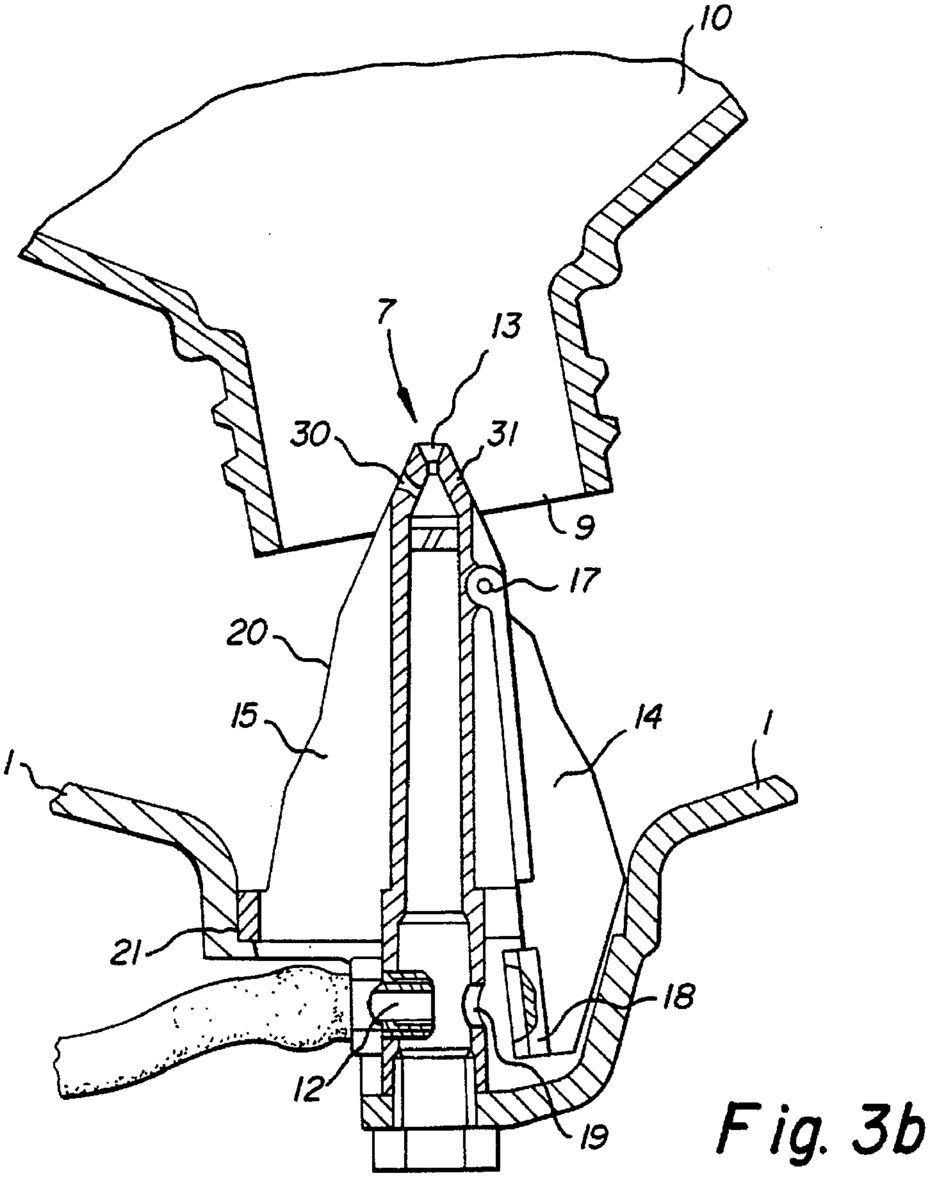
Figure 3C:
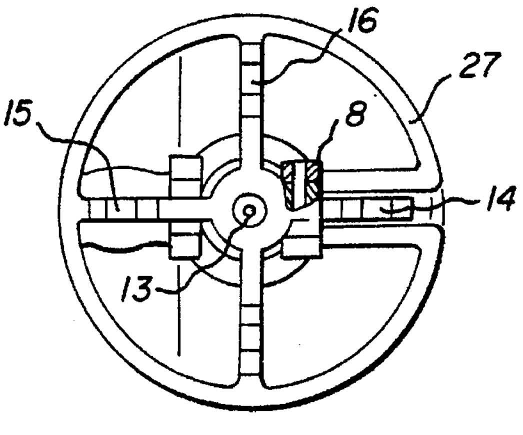

As shown in FIGS. 3*a* to 3*c*, the nozzle 7 consists of a cylindrical tube 11 at one end of which is a side inlet 12 and the other end of which has the shape of a truncated cone with a central outlet 13 through which the rinsing fluid, ideally water, flows. The cylindrical tube 11 has at least three centering fins 14, 15, 16 arranged radically at evenly spaced intervals around its outer circumference, at least one of those centering fins 14 performing the function of a valve mechanism 8. The centering fin 14 acting as the valve mechanism 8 is pivoted around an axis 17 which is laterally offset and at right angles to the central axis of the cylindrical tube 11 so that a seal 18 integrated in the centering fin 14 can be made to open or close a valve outlet 19 in the cylindrical tube 11. Since, as shown in FIG. 2, the inlet 12 and the valve outlet 19 are positioned opposite one another in the cylindrical tube 11 and below the base 3 of the emptying trough 1, when the valve outlet 19 is closed the rinsing fluid flows out of the outlet 13 and into the container 10 when the neck 9 of the container is placed over the nozzle 7. In order to increase the rinsing efficiency, the lip of the nozzle with its central outlet 13 can be provided with additional outlets 30, 31. The resulting mixture of concentrate and rinsing water runs unobstructed into the mixing tank through the quadrant-shaped outlets formed by the centering fins 14, 15, 16 and a holding fixture 21.

If, on the other hand, the container 10 is removed from the nozzle 7, the pressure of the rinsing water opens the valve outlet 19 so that the rinsing water flows out through the outlet 19 only. In order to facilitate location of the nozzle 7 in the emptying outlet 5 of the emptying trough 1, the centering fins 14, 15, 16 are held in a circular holding fixture 21.

In order to be capable of accepting chemical containers with necks 9 of differing sizes, the contours of the outer edges 20 of the centering fins 14, 15, 16 follow a series of varying gradients.

The water supply for the nozzle 7 is brought via a pipe 24 connecting the inlet 12 via a pump **23*b* with a water trough 26 fixed to the inner wall of the mixing tank 2 at a position above the highest possible liquid level in the mixing tank (indicated by the dotted line in the mixing bath 2 in FIG. 1). The water trough 26 is filled with fresh water by means of a water outlet 25 supplied by a second pipe 22 and positioned at a distance above the water trough. In the supply pipe 22 is a control valve 23*a* for regulating/restricting the flow of water through the water outlet 25** to a rate of approx. 5 liters/minute.

An ultrasonic sensor 29 which transmits sound waves which are deflected by a reflector 28 down a pipe 27 with a fluid connection to the mixing tank 2 detects the level of liquid in the mixing tank. Other features of the mixing unit, such as the means of stirring the fluid in the mixing tank 2, the arrangement of the storage tank, the details of the central control unit, etc., can be obtained from the operating instructions for the Automixer II mixing unit for photographic processing fluids, manufactured by Kodak AG, Stuttgart, and will not be described in further detail at this point.

The function of the apparatus according to the invention is described below with reference to FIG. 1.

When chemical containers 10 filled respectively with developing fluid and fixing solution are inserted through the locating holes 5 in the locating plate 4 and pushed onto the nozzles 7, the conical tips of the nozzles puncture the sealing membranes across the necks 9 of the containers. The containers 10 are centered according to the width of their necks 9 by the centering fins 14, 15, 16 and when the container neck is pushed fully home, the valve outlet 19 in the cylindrical tube 11 is closed by the valve mechanism 8. After a predetermined dwell time sufficient to ensure that the containers 10 empty completely into the mixing tank 2, the control unit of the Automixer (not illustrated) opens the valve **23*a* so that fresh tap water runs through the pipe 22 and out of the outlet 25 into the water trough 26. Shortly, i.e. approx. 3 to 5 seconds, after the valve 23*a* is opened, the pump 23*b* pumps water at a rate of approximately 2 to 3 liters per minute through the pipe 24 and out of the outlet 13 of the cylindrical tube 11 so that the container is rinsed out. At the same time, the ultrasonic sensor 29, by means of which the liquid level in the pipe connected to the mixing tank can be detected in the familiar manner, is switched on. The mixture of rinsing water and chemical residue from the container runs directly without further treatment into the mixing tank 2, the duration of the rinsing operation being pre-definable by the control unit of the Automixer and lasting around 1 to 2 minutes for optimum cleaning of the containers. On completion of that period, the pump 23*b* switches off. If one or both containers are intentionally or unintentionally removed from the nozzle(s) 7 by the operative during the rinsing operation, the valve mechanism 8 is opened by the pressure of the water and the rinsing water flows out safely through the valve opening 19 positioned below the base 3 into the mixing tank 2 and continues to do so for as long as the valve 23*a*** remains open.

A volume of water appropriate to the capacity, and thus the content, of the photographic chemical containers 10 is fed into the mixing tank via the water trough 26 until the desired mixture concentration is obtained. That concentration is represented by a specific level of fluid in the mixing tank calculated according to the known volume of the mixing tank, so that when the fluid in the mixing tank reaches that specified level, the sensor 29 sends a signal to the control unit to indicate that the valve **23*a*** is to be shut off.

Since the amount of water running into the mixing tank 2 from the rinsing of the containers 10 is always significantly less than that required for obtaining the desirable maximum concentration for photographic processing fluid, it is useful for the solution created by the rinsing operation to be passed directly into the processing cycle, i.e. without further treatment. The containers 10 can now be removed from the nozzles 7 and recycled in a clean condition.

In order to make full use of the capacity of the mixing tank 2, the above procedure is normally performed twice but without water being added to the solution in the mixing tank before the second set of chemical containers is emptied into it, i.e. the level to which the fluid in the mixing tank is to be filled up with water is increased, for example to the level indicated by the dotted line in the mixing tank 2 in FIG. 1, in accordance with the amount of concentrate added.

The process of mixing, stirring and removing the photographic processing fluid from the mixing tank is familiar from the description of the mixing unit of the Automixer produced by the above mentioned company.

What is claimed is:

1. An apparatus for emptying and rinsing out photographic chemical containers into a mixing tank, said apparatus having an emptying trough for emptying the chemicals into the mixing tank, the emptying trough having a base and a locating plate opposite the base, the base having outlets corresponding to locating holes in the locating plate provided for emptying the chemical containers through their open necks, each outlet having a nozzle comprised of a cylindrical tube, said cylindrical tube having at least three centering fins arranged radially at evenly spaced intervals around the outer circumference of said cylindrical tube, at least one of said centering fins performing the function of a valve mechanism so that said valve mechanism can be operated by placing the neck of a chemical container over the nozzle or removing it from same.

2. An apparatus for emptying and rinsing out photographic chemical containers into a mixing tank, said apparatus comprising an emptying trough for emptying the chemicals into the mixing tank, the emptying trough having a base and a locating plate opposite the base, the base having outlets corresponding to locating holes in the locating plate provided for emptying the chemical containers through their open necks, each outlet having a nozzle comprised of a cylindrical tube, said cylindrical tube having at least three centering fins arranged radially at evenly spaced intervals around the outer circumference of said cylindrical tube, said cylindrical tube having a side inlet at one end and having at an other end the shape of a truncated cone with a central outlet through which rinsing fluid can pass, at least one of said centering fins performing the function of a valve mechanism so that said valve mechanism can be operated by placing the neck of a chemical container over the nozzle or removing it from same.

3. The apparatus according to claim 2 wherein said centering fin acting as the valve mechanism is pivoted around an axis offset laterally and at right angles relative to a central axis of said cylindrical tube and in that said centering fin incorporates a seal by means of which a side valve outlet in the cylindrical tube can be closed off.

4. The apparatus according to claim 3 wherein said side inlet and said side valve outlet in said cylindrical tube are positioned opposite one another and below the base of the emptying trough.

5. The apparatus according to claim 2 wherein said centering fins are held in a circular holding fixture by means of which the nozzle can be fitted into the emptying outlet.

6. The apparatus according to claim 2 wherein contours of the outer edges of the centering fins follow a series of varying gradients for the purpose of accepting chemical containers with necks of varying sizes.

7. The apparatus according to claim 2 wherein said conical end of the nozzle with the central outlet has additional outlets near the tip.

* * * * *